US012068886B2

(12) United States Patent
Shen et al.

(10) Patent No.: US 12,068,886 B2
(45) Date of Patent: Aug. 20, 2024

(54) SYSTEMS AND METHODS FOR PROVIDING SD-WAN FABRIC CONNECTIVITY OVER IPV6 TRANSIT NETWORKS VIA AN AUTOMATIC IPV4 OVER IPV6 TUNNEL

(71) Applicant: Cisco Technology, Inc., San Jose, CA (US)

(72) Inventors: Changhong Shen, Shanghai (CN); Ruozhong Xuan, San Ramon, CA (US); Sampath Kumar Sthothra Bhasham, Santa Clara, CA (US); Vincent Li, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 6 days.

(21) Appl. No.: 17/817,775

(22) Filed: Aug. 5, 2022

(65) Prior Publication Data
US 2023/0336376 A1    Oct. 19, 2023

Related U.S. Application Data

(60) Provisional application No. 63/331,912, filed on Apr. 18, 2022.

(51) Int. Cl.
*H04L 12/46* (2006.01)
*H04L 45/74* (2022.01)
(Continued)

(52) U.S. Cl.
CPC .......... *H04L 12/4633* (2013.01); *H04L 45/74* (2013.01); *H04L 61/251* (2013.01); *H04L 61/5014* (2022.05); *H04L 67/141* (2013.01)

(58) Field of Classification Search
None
See application file for complete search history.

(56) References Cited

U.S. PATENT DOCUMENTS

2016/0309524 A1* 10/2016 Sargento ................. H04W 8/08
2021/0243053 A1    8/2021 Dunbar

FOREIGN PATENT DOCUMENTS

CN    1729663 B  * 10/2010    ............. H04L 69/40
JP    4744479 B2 *  8/2011
(Continued)

OTHER PUBLICATIONS

Cisco_IPSLA et al "IP SLAs Configuration Guide, Cisco IOS Release 15M&T" (Year: 2013).*
(Continued)

*Primary Examiner* — Younes Naji
(74) *Attorney, Agent, or Firm* — Baker Botts L.L.P.

(57) ABSTRACT

In one embodiment, a method includes acquiring an Internet Protocol version 6 (IPv6) address for a physical interface of a first network element. The method also includes configuring an Internet Protocol version 4 (IPv4) over IPv6 tunnel between the first network element and a second network element using the physical interface of the first network element. The method also includes acquiring an updated IPv6 address for the physical interface of the first network element and using an IPv6 Service Level Agreement (SLA) Hypertext Transfer Protocol (HTTP) operation to notify the second network element of the updated IPv6 address to establish a bidirectional IPv4 over IPv6 tunnel. The method further includes establishing a control connection with an IPv4 SD-WAN controller and automatically building an SD-WAN overlay tunnel with the bidirectional IPv4 over IPv6 tunnel as a transport.

20 Claims, 6 Drawing Sheets

(51) Int. Cl.
*H04L 61/251* (2022.01)
*H04L 61/5014* (2022.01)
*H04L 67/141* (2022.01)

(56) References Cited

FOREIGN PATENT DOCUMENTS

| JP | 20122098474 A | 10/2012 |
|---|---|---|
| WO | 2021155389 A2 | 8/2021 |
| WO | 2022017099 A1 | 1/2022 |

OTHER PUBLICATIONS

Cisco_6To4 et al. "interface and Hardware Component Configuration Guide, Cisco IOSRelease 15M&T" (Year: 2014).*
VMware SD-WAN 4.3.0 Release Notes, updated Apr. 13, 2022.
The Modern Secure Network Blog, Product & Engineering, Managing IPv4 to IPv6 Transition with SD-WAN, Versa Staff, Versa Networks Oct. 20, 2018.
International Search Report and Written Opinion corresponding to PCT/US2023/018006, dated Jun. 13, 2023, 13 pages.
Farrer Deutsche Telekom AG, Q. Sun, Y. Cui, L. Sun, Tsinghua University: Softwire Provisioning Using DHCPv4 over DHCPv6; RFC8539.TXT, Internet Engineering Task Force, IETF; Standard, Internet Society (ISOC) 4, Rue Des Falaises CH-1205 Geneva, Switzerland, dated Mar. 2019, 18 pages.
Mar. 15, 2019 (Mar. 15, 2019), pp. 1-18, XP01513097, Retrieved from the Internet: URL:https://tools.ietf.org/html/rfc8539 [retrieved on Mar. 15, 2019] abstract paragraphs [0005], [7.2.1], [0008], [08.1].
C. Liu, Q. Sun, J. Wu, Tsinghua University: "Dynamic IPv4 Provisioning for Lightweight 4over6 draft-liu-softwire-lw4over6-dhcp-deployment-05.txt", Dynamic IPv4 Provisioning for Lightweight 4 over6; Draft-Liu-Software-LW4over6-DHCP-Deployment-05.txt, Internet Engineering Task Force, IETF; standardworkingdraft, Internet Society (ISOC) 4, Rue Des Falaises CH-1205 Geneva, Switzerland, Oct. 13, 2014 (Oct. 13, 2014), pp. 1-8, XP015102129 [retrieved on Oct. 13, 2014] paragraphs [04.1] -[04.3], [04.5].
Y. Cui, Tsinghua University; Q. Sun, China Telecom; M. Boucadair, France Telecom; T. Tsou, Huawei Technologies, Y. Lee, Comcast; I. Farrer, Deutsche Telecom AG: "Lightweight 4over6: An Extension to the Dual-Stack Lite Architecture; rfc7596.txt", Internet Engineering Task Force, IETF; Standard, Internet Society (ISPC) 4, Rue Des Falaises CH-1205 Geneva, Switzerland, Jul. 31, 2015 (Jul. 31, 2015), pp. 1-22, XP015107650 [retrieved on Jul. 31, 2015] paragraphs [0003], [0004], [05,1],22 pages.
I. Farrer et al, Deusche Telekon AG, M. Boucadair, Orange; "Yang Modules for IPv4-in-IPv6 Address plus Port (A+P) Softwires; rfc 8676.txt", Internet Engineering Task Force, IETF; Standard, Internet Society (ISOC) 4, Rue Des Falaises CH-1205 Geneva, Switzerland, Nov. 17, 2019, (Nov. 17, 2019), pp. 1-28 XP015135172, Retrieved from Internet: URL:https://tools.ietf.org/html/rfc8676 [retrieved on Nov. 17, 2019] paragraphs [0001], [0002], [04.2].
M. Blanchet, Viagenie; O. Medina ENST Bretagne; F. Parent, Viagenie: "DSTM IPv4 over IPv6 tunnel profile for Tunnel Setup Protocol (TSP) draft-blanchet-ngtrans-tsp-dstm-profile-01", Internet Engineering Task Force, IETF; Standardworkingdraft, Internet Society (ISPC), Rue, No. 1, Jul. 1, 2002 (Jul. 1, 2002), XP015000297, paragraphs [0001], [0002], [02.1], 13 pages.
Z. Liu, et al: "Dynamic Configuration for IPv4/IPv6 Address Mapping in 4over6 Technology", Department of Computer Science and Technology, Tsinghua University, Beijing, China, Department of Computer Science, Aalto University, Finland, 2015 IEEE 9th International Conference on Anti-Counterfeiting, Security, and Identification (ASID), IEEE Sep. 25, 2015 (Sep. 25, 2015), pp. 132-136, XP032864313, DOI: 10.1109/ICASID.2015,7405677 ISBN: 978-1-4673-7139-1 [retrieved on Feb. 11, 2016] paragraphs [0001], [0003].

* cited by examiner

⟋— Configuration 200

⟋— Commands 204-262   ⟋— CLI 202

204 —⟋ interface GigabitEthernet0/0/01
206 —⟋ descpription NGN IPv6 Transports
208 —⟋ load interval 30
210 —⟋ negotiation auto
212 —⟋ ipv6 dhcp client pd prefix-from-provider
214 —⟋ ipv6 dhcp client request vendor
216 —⟋ ipv6 address dhcp
218 —⟋ ipv6 address fe80::6a:b99d:100:0 link local
220 —⟋ ipv6 address autoconfig default-route
222 —⟋ ipv6 nd ra supress all
224 —⟋ ipv6 enable
   !
226 —⟋ interface Loopback1000
228 —⟋ no shutdown
230 —⟋ ip address 200.61.10.1 255.255.255.0
232 —⟋ exit
234 —⟋ interface tunnel1000
236 —⟋ ip unnumbered Loopback1000
238 —⟋ ip mtu 1460
240 —⟋ ip nat outside
242 —⟋ ip tcp adjust-mss 1420
244 —⟋ tunnel source GigabitEthernet0/0/1
246 —⟋ tunnel destination 2002:1:1:1::2
248 —⟋ tunnel mode ipv6
250 —⟋ tunnel path-mtu-discovery
252 —⟋ tunnel route-via GigabitEthernet0/0/1 mandatory
   !
254 —⟋ ip sla 110
256 —⟋ http get http://example.cisco.com/update?user=jpnefitest&pass=jpnefixtest001
         name=server 2001:4860:4860::8888 source-interface GigabitEthernet0/0/1
   !
258 —⟋ ip sla schedule 110 life forever start-time now

*FIG. 2*

Configuration 300

Commands 304-334 — CLI 302

```
304 — ip route 0.0.0.0 0.0.0.0 Tunnel1000 200.60.10.2
306 —   ip nat inside source list nat-dia-vpn-hop-access-list interface Tunnel1000 overload
308 —   interface Tunnel10001
310 —     no shutdown
312 —     ip unnumbered Loopback1000
314 —     tunnel source Loopback1000
316 —     tunnel mode sdwan
318 —   exit
320 —   sdwan
322 —     interface Loopback1000
324 —       tunnel-interface
326 —       encapsulation ipsec
328 —       color public-internet
330 —       bind tunnel1000
332 —     exit
334 —   exit
```

*FIG. 3*

SD-WAN control connections 400

Br4-cEdge1#show sdwan control connections — CLI 402

| | peer type 410 | peer protocol 412 | peer system IP 414 | site ID 416 | domain ID 418 | peer private IP 420 | private port 422 | peer public IP 424 | public port 426 | group organization 428 | local color 430 | proxy 432 | state 434 | uptime 436 | ID |
|---|---|---|---|---|---|---|---|---|---|---|---|---|---|---|---|
| 400a | vsmart | dtls | 10.8.3.3 | 10 | 1 | 172.16.3.2 | 12446 | 172.16.3.2 | 12446 | Cisco Sy1-19968 | public-internet | no | up | 2:19:09:15 | 0 |
| 400b | vsmart | dtls | 10.8.4.4 | 10 | 1 | 172.16.4.2 | 12446 | 172.16.4.2 | 12446 | Cisco Sy1-19968 | public-internet | no | up | 2:19:09:15 | 0 |
| 400c | vmanage | dtls | 10.8.1.1 | 10 | 0 | 172.16.1.2 | 13046 | 172.16.1.2 | 13046 | Cisco Sy1-19968 | public-internet | no | up | 2:19:09:15 | 0 |

FIG. 4

SD-WAN BFD sessions 500

Br4-cEdge1#show sdwan bfd sessions — CLI 502

| | system IP 510 | site ID 512 | state 514 | source TLOC color 516 | remote TLOC color 518 | source IP 520 | destination public IP 522 | destination public port 524 | encapsulation 526 | detect multiplier 528 | TX interval 530 | uptime 532 | transitions 534 |
|---|---|---|---|---|---|---|---|---|---|---|---|---|---|
| 500a | 10.5.0.1 | 500 | up | public-internet | public-internet | 200.61.10.1 | 176.16.5.2 | 12346 | ipsec | 7 | 1000 | 0:00:00:05 | 0 |
| 500b | 10.1.0.1 | 101 | up | public-internet | public-internet | 200.61.10.1 | 176.16.12.30 | 5063 | ipsec | 7 | 1000 | 0:00:00:05 | 0 |
| 500c | 10.1.0.2 | 100 | up | public-internet | public-internet | 200.61.10.1 | 176.16.12.30 | 12346 | ipsec | 7 | 1000 | 0:00:00:05 | 0 |
| 500d | 10.10.0.2 | 1000 | up | public-internet | public-internet | 200.61.10.1 | 176.16.100.118 | 5063 | ipsec | 7 | 1000 | 0:00:00:05 | 0 |
| 500e | 10.10.20.1 | 1020 | up | public-internet | public-internet | 200.61.10.1 | 176.16.120.2 | 12346 | ipsec | 7 | 1000 | 0:00:00:05 | 0 |
| 500f | 10.10.40.1 | 1040 | up | public-internet | public-internet | 200.61.10.1 | 176.16.140.2 | 12346 | ipsec | 7 | 1000 | 0:00:00:05 | 0 |
| 500g | 10.10.60.1 | 1060 | up | public-internet | public-internet | 200.61.10.1 | 176.16.160.2 | 12346 | ipsec | 7 | 1000 | 0:00:00:05 | 0 |
| 500h | 10.10.60.3 | 1060 | up | public-internet | public-internet | 200.61.10.1 | 176.16.160.10 | 12346 | ipsec | 7 | 1000 | 0:00:00:05 | 0 |
| 500i | 10.10.70.1 | 1070 | up | public-internet | public-internet | 200.61.10.1 | 176.16.170.2 | 12346 | ipsec | 7 | 1000 | 0:00:00:05 | 0 |
| 500j | 10.10.90.1 | 1090 | up | public-internet | public-internet | 200.61.10.1 | 176.16.190.2 | 12346 | ipsec | 7 | 1000 | 0:00:00:05 | 0 |

FIG. 5

SYSTEMS AND METHODS FOR PROVIDING SD-WAN FABRIC CONNECTIVITY OVER IPV6 TRANSIT NETWORKS VIA AN AUTOMATIC IPV4 OVER IPV6 TUNNEL

CROSS-REFERENCE TO RELATED APPLICATIONS

This application claims benefit of U.S. Provisional Patent Application No. 63/331,912 filed Apr. 15, 2022 by Ruozhong Xuan et al. and entitled "SIMPLIFIED SD-WAN FABRIC CONNECTIVITY OVER IPV6 TRANSIT NETWORKS VIA AUTOMATIC IPV4 OVER IPV6 TUNNEL," which is incorporated herein by reference as if reproduced in its entirety.

TECHNICAL FIELD

The present disclosure relates generally to communication networks, and more specifically to systems and methods for providing software-defined wide area network (SD-WAN) fabric connectivity over Internet Protocol version 6 (IPv6) transit networks via an automatic Internet Protocol version 4 (IPv4) over IPv6 tunnel.

BACKGROUND

SD-WAN is a cloud-delivered wide area network (WAN) overlay architecture that extends the principles of software-defined networking (SDN) into the WAN. An SD-WAN overlay fabric may be used to connect data centers, branches, campuses, and colocation facilities to improve network speed, security, and efficiency. During the network transition from IPv4 to IPv6, some SD-WAN sites have only IPv6 connectivity. However, IPv4 Internet services are still widely used.

BRIEF DESCRIPTION OF THE DRAWINGS

FIG. 2 illustrates a configuration to support the establishment of an IPv4 over IPv6 tunnel, in accordance with certain embodiments.

FIG. 3 illustrates a configuration to support SD-WAN fabric connectivity via NAT44 for an IPv4 over IPv6 tunnel via a single loopback interface with a public global Internet Protocol (IP) address, in accordance with certain embodiments.

FIG. 4 illustrates SD-WAN control connections, in accordance with certain embodiments.

FIG. 5 illustrates SD-WAN Bidirectional Forwarding Detection (BFD) sessions, in accordance with certain embodiments.

DESCRIPTION OF EXAMPLE EMBODIMENTS

Overview

Figure 1:
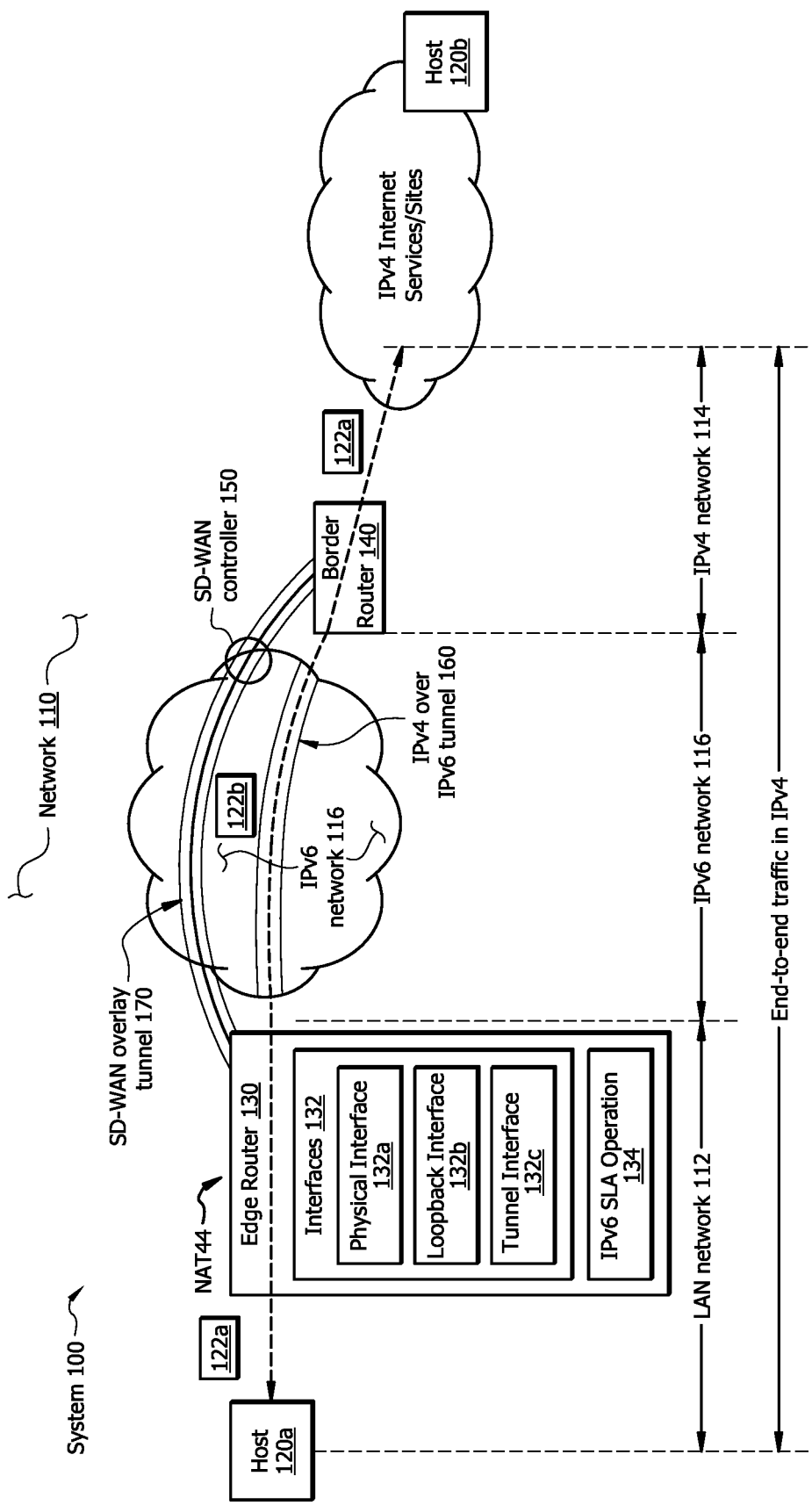
FIG. 1 illustrates a system for providing SD-WAN fabric connectivity over an IPv6 transit network via an automatic IPv4 over IPv6 tunnel, in accordance with certain embodiments.

According to an embodiment, a first network element includes one or more processors and one or more computer-readable non-transitory storage media coupled to the one or more processors and including instructions that, when executed by the one or more processors, cause the first network element to perform operations. The operations include acquiring an IPv6 address for a physical interface of the first network element. The operations also include configuring an IPv4 over IPv6 tunnel between the first network element and a second network element using the physical interface of the first network element. The operations further include acquiring an updated IPv6 address for the physical interface of the first network element and using an IPv6 Service Level Agreement (SLA) Hypertext Transfer Protocol (HTTP) operation to notify the second network element of the updated IPv6 address to establish a bidirectional IPv4 over IPv6 tunnel. In some embodiments, the first network element is an SD-WAN edge router and/or the second network element is a general IPv6 border router.

In certain embodiments, the operations include configuring a loopback interface, assigning the loopback interface an IPv4 address, configuring an SD-WAN overlay tunnel using the loopback interface, and/or binding the SD-WAN overlay tunnel to the IPv4 over IPv6 tunnel. In some embodiments, the operations include communicating with an IPv4 SD-WAN controller via the bidirectional IPv4 over IPv6 tunnel of an underlay network, establishing a control connection with the IPv4 SD-WAN controller, and/or automatically building the SD-WAN overlay tunnel with the bidirectional IPv4 over IPv6 tunnel as a transport.

In some embodiments, the operations include configuring network address translation (NAT) on the loopback interface of the IPv4 over IPv6 tunnel and receiving an IPv4 packet from a host. The IPv4 packet includes a service-side source IPv4 address and a destination IPv4 address, and the destination IPv4 address is associated with a remote SD-WAN site. The operations may include translating, using NAT, the service-side source IPv4 address to a public IPv4 address, encapsulating the IPv4 packet within an IPv6 packet, and/or communicating, via the bidirectional IPv4 over IPv6 tunnel, the IPv4 packet to the second network element.

In certain embodiments, the IPv6 SLA HTTP operation includes a Uniform Resource Locator (URL), an IP address of a name server, and an identification of the physical interface as a source interface for the IPv6 SLA HTTP operation. In some embodiments, the operations include establishing a Datagram Transport Layer Security (DTLS) control connection with one or more controllers. In certain embodiments, the IPv6 address of the physical interface is automatically assigned by a Dynamic Host Configuration Protocol (DHCP) version 6 (DHCPv6) server or by an IPv6 auto-configuration. In some embodiments, the IPv4 address of the loopback interface is provided by a service provider.

According to another embodiment, a method includes acquiring an IPv6 address for a physical interface of a first network element. The method also includes configuring an IPv4 over IPv6 tunnel between the first network element and a second network element using the physical interface of the first network element. The method further includes acquiring an updated IPv6 address for the physical interface of the first network element and using an IPv6 SLA HTTP operation to notify the second network element of the updated IPv6 address to establish a bidirectional IPv4 over IPv6 tunnel.

According to yet another embodiment, one or more computer-readable non-transitory storage media embody instructions that, when executed by a processor, cause the processor to perform operations. The operations include acquiring an IPv6 address for a physical interface of a first network element. The operations also include configuring an IPv4 over IPv6 tunnel between the first network element and a second network element using the physical interface of the first network element. The operations further include acquiring an updated IPv6 address for the physical interface of the first network element and using an IPv6 SLA HTTP operation to notify the second network element of the updated IPv6 address to establish a bidirectional IPv4 over IPv6 tunnel.

Technical advantages of certain embodiments of this disclosure may include one or more of the following. Certain embodiments of this disclosure allow a service provider to manage and automate the IPv4 over IPv6 tunnel configuration without dependency of sites addressing since the tunnels can be established bi-directionally based on transport interface addresses acquired automatically. This may simplify operational overload when scaled up to hundreds or thousands of remote sites. Certain embodiments of this disclosure provide a simplified and effective solution for Plug and Play (PnP) support. Some embodiments of this disclosure connect isolated IPv4 networks to IPv4 SD-WAN controllers via an automatic IPv4 over IPv6 tunnel transit in a service provider network environment. Certain embodiments of this disclosure enhance the IPv6 SLA operation to allow a network element to automatically acquire updated transport interface IPv6 addresses, which allows the network element to establish a bi-directional tunnel. Some embodiments of this disclosure track Transport Location (TLOC) addresses. In certain embodiments of this disclosure, an IPv4 loopback interface is used to establish an SD-WAN overlay tunnel. Some embodiments of this disclosure us the IPv4 loopback interface to perform NAT. In certain embodiments, templatized site configurations are used to establish an SD-WAN fabric with remote sites having IPv4 broadband connectivity.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

This disclosure describes systems and methods for providing SD-WAN fabric connectivity over an IPv6 transit network via an automatic IPv4 over IPv6 tunnel. During the network transition from IPv4 to IPv6, some SD-WAN sites (e.g., SD-WAN sites in Japan) have only Next Generation Network (NGN) IPv6 connectivity. However, IPv4 Internet services are still popular, and SD-WAN controllers may not be ready for full IPv6 support. There are general requirements to support IPv4 over IPv6 networks for transit and customers who want to utilize NGN IPv6 services as their underlay. The requirements necessary to support SD-WAN fabric connectivity over IPv6 transit networks may present the following challenges: (1) automatically configuring the IPv6 address and supporting the automatic IPv4 over IPv6 tunnel; (2) detecting and reporting the transport side address changes; (3) supporting PnP over the IPv4 over IPv6 tunnel; and (4) connecting SD-WAN over the IPv6 network transit.

In most typical SD-WAN deployments, native IPv4 or IPv6 network connectivity is common at the transport side for underlay network connectivity. However, SD-WAN network transit over an IPv6 network is new at SD-WAN Edge sites. While tunneling is a common approach for IPv6 network transit, there are couple of challenges to support PnP with SD-WAN fabric connectivity and to address the simplicity of operation for isolated remote sites without direct Multiprotocol Label Switching (MPLS) or Internet access via Broadband or 3G/Long Term Evolution (LTE) connectivity.

Embodiments of this disclosure simplify SD-WAN fabric connectivity over IPv6 transit networks via an automatic IPv4 over IPv6 tunnel. The automatic IPv4 over IPv6 tunnel encapsulates IPv4 packets in IPv6 packets for delivery across an IPv6 infrastructure. Overlay tunnels allow communication with isolated IPv4 networks. In certain embodiments, IPv4 over IPv6 tunnels are configured between SD-WAN devices. Overlay tunnels may be configured to run over an IPv6 network layer and to transport IPv4 packets in IPv6 tunnels. Embodiments of this disclosure provide a simplified and effective solution to connect isolated IPv4 networks to IPv4 SD-WAN controllers via an automatic IPv4 over IPv6 tunnel transit in a service provider network environment.

FIG. 1 illustrates a system 100 for providing SD-WAN fabric connectivity over IPv6 transit networks via an automatic IPv4 over IPv6 tunnel, in accordance with certain embodiments. System 100 or portions thereof may be associated with an entity, which may include any entity, such as a business, company, or enterprise, that provides SD-WAN fabric connectivity over an IPv6 transit network. In certain embodiments, the entity may be a service provider that provides SD-WAN fabric connectivity over an IPv6 transit network. The components of system 100 may include any suitable combination of hardware, firmware, and software. For example, the components of system 100 may use one or more elements of the computer system of FIG. 7.

In the illustrated embodiment of FIG. 1, system 100 includes a network 110, a LAN 112, an IPv4 network 114, an IPv6 network 116, hosts 120 (a host 120a and a host 120b), packets 122 (an IPv4 packet 122a and an encapsulated IPv6 packet 122b), an edge router 130, interfaces 132 (a physical interface 132a, a loopback interface 132b, a tunnel interfaces 132c), IPv6 SLA operation 134, a border router 140, an SD-WAN controller 150, an IPv4 over IPv6 tunnel 160, and an SD-WAN overlay tunnel 170.

Network 110 of system 100 is any type of network that facilitates communication between components of system 100. Network 110 may connect one or more components of system 100. One or more portions of network 110 may include an ad-hoc network, an Internet, an intranet, an extranet, a virtual private network (VPN), an Ethernet VPN (EVPN), a local area network (LAN), a wireless LAN (WLAN), a virtual LAN (VLAN), a WAN, a wireless WAN (WWAN), an SD-WAN, a metropolitan area network (MAN), a portion of the Public Switched Telephone Network (PSTN), a cellular telephone network, a Digital Subscriber Line (DSL), an MPLS network, a 3G/4G/5G network, an LTE network, a cloud network, a combination of two or more of these, or other suitable types of networks. Network 110 may include one or more different types of networks.

Network 110 may be any communications network, such as a private network, a public network, a connection through the Internet, a mobile network, a WI-FI network, etc. Network 110 may include a core network, an access network of a service provider, an Internet service provider (ISP) network, and the like. An access network is the part of the network that provides a user access to a service. A core network is the part of network 110 that acts like a backbone to connect the different parts of the access network(s). One or more components of system 100 may communicate over network 110. In the illustrated embodiment of FIG. 1, network 110 is an SD-WAN.

In the illustrated embodiment of FIG. 1, network 110 includes LAN 112, IPv4 network 114, and IPv6 network 116. LAN 112 interconnects computers within a limited area such as an office building, a residence, a school, a laboratory, a university campus, and the like. In certain embodiments, LAN 112 is an IPv4 LAN that uses IPv4 addresses. IPv4 network 114 is a network that uses IPv4 addresses, which may be represented in any notation expressing a 32-bit integer value. IPv4 network 114 may include one or more IPv4 Internet services, one or more IPv4 Internet sites, etc. IPv6 network 116 is a network that uses IPv6 addresses, which may be represented in any notation expressing a 128-bit integer value. IPv6 network 116 may include one or more IPv6 Internet services, one or more IPv6 Internet sites, etc.

Network 110 of system 100 may include one or more nodes. Nodes are connection points within network 110 that receive, create, store and/or send data along a path. Nodes may include one or more redistribution points that recognize, process, and forward data to other nodes of network 110. Nodes may include virtual and/or physical nodes. For example, nodes may include one or more virtual machines, bare metal servers, and the like. As another example, nodes may include data communications equipment such as computers, routers, servers, printers, workstations, switches, bridges, modems, hubs, and the like. In the illustrated embodiment of FIG. 1, nodes of network 110 include hosts 120 (host 120a and host 120b), edge router 130, border router 140, and SD-WAN controller 150.

Hosts 120 (host 120a and host 120b) of system 100 are devices (e.g., servers or clients) that are connected to network 110. In certain embodiments, hosts 120 provide resources, data services, and/or programs to clients. In the illustrated embodiment of FIG. 1, hosts 120 are IPv4 hosts. Each host 120 may be associated with a unique IPv4 address, a hostname, etc. The IPv4 address of each host 120 may serve as the physical address of host 120 in network 110. In certain embodiments, the IPv4 address is a 32-bit integer value. The hostname is a label assigned to host 120. Hosts 120 may provide the processing, memory, local storage, and/or network connectivity that drive applications. In the illustrated embodiment of FIG. 1, host 120a is associated with LAN 112, and host 120b is associated with IPv4 network 114. Host 120a communicates IPv4 packets 122a to one or more components of network 110.

IPv4 packets 122a are network communication data units that carry data during transmission. Each IPv4 packet 122a includes an IPv4 header. The IPv4 header may include one or more of the following fields: an IP version (i.e., version 4), a header length, a type of service (e.g., Quality of Service (QoS)), a total length of IPv4 packet 122a, an identification, IP flags, a fragment offset, a time to live, a protocol (e.g., Transmission Control Protocol (TCP) or User Datagram Protocol (UDP)), a 32 bit source address, a 32 bit destination address, an IP option, and the like. In the illustrated embodiment of FIG. 1, host 120a communicates IPv4 packets 122a to edge router 130.

Edge router 130 is specialized router that resides at the boundary of LAN 112 and IPv6 network 114. Edge router 130 allows LAN 112 to connect to IPv6 network 116. In certain embodiments, edge router 130 uses static and/or dynamic routing to send data to and/or receive data from one or more networks 110 of system 100. Edge router 130 may include software, one or more hardware devices, one or more servers that include routing software, and the like. In certain embodiments, edge router 130 is a customer edge device that receives traffic from one or more customer devices (e.g., host 120a). In certain embodiments, edge router 130 is a dual stack device that can run IPv4 and IPv6 in parallel.

Edge router 130 includes interfaces 132 (physical interface 132a, loopback interface 132b, and tunnel interfaces 132c). Physical interface 132a is an interface having some form of physical (hardware) element (e.g., a male connector on an Ethernet cable). Physical interface 132a may include one or more Ethernet interfaces, Fast Ethernet interfaces, Gigabit Ethernet interfaces, serial interfaces (high-speed, synchronous, etc.), and the like.

In certain embodiments, edge router 130 assigns an IPv6 address to physical interface 132a. For example, edge router 130 may use a DHCPv6 server or by an IPv6 auto-configuration to automatically assign a unique, dynamic IPv6 address to physical interface 132a (see, e.g., commands 212 and 214 of FIG. 2). In certain embodiments, the DHCP server updates the IPv6 address. For example, the DHCP server may update the IPv6 address associated with physical interface 132a in the event the DHCP client renews or updates its IP address configuration data with the DHCP server. In certain embodiments, the IPv6 address of physical interface 132a is a link-local address. The link-local address may be automatically or manually configured using an IPv6 address link-local command (see, e.g., command 218 of FIG. 2).

Loopback interface 132b and tunnel interfaces 132c are virtual interfaces. Virtual interfaces exist only in software and have no physical elements. Virtual interfaces may include one or more loopback interfaces 132b, tunnel interfaces 132c, null interfaces, and the like. Virtual interfaces may be identified using a virtual interface name and a numerical identifier. For example, loopback interface 132b may be identified as "loopback 0". As another example, tunnel interface 132c may be identified as "tunnel 1". The identifier is unique per virtual interface type to make the entire name string unique.

Loopback interface 132b of system 100 is a software-only interface that emulates a physical interface. In certain embodiments, loopback interface 132b remains up (active) until instructed to shut down (see, e.g., "no shutdown" command 228 of FIG. 2). Loopback interface 132b is independent of the state of any physical interface. In certain embodiments, the IP address of loopback interface 132b is configured as an IPv4 address (see, e.g., command 230 of FIG. 2).

Tunnel interfaces 132c of system 100 represent the tunnel interfaces for IPv4 over IPv6 tunnel 160 and SD-WAN overlay tunnel 170. In certain embodiments, one or more tunnel interfaces 132c provide encapsulation of arbitrary packets within another transport protocol. Tunnel interfaces 132c may not be tied to a specific "passenger" or "transport" protocol. In certain embodiments, one or more tunnel interfaces 132c are designed to provide the services necessary to implement any standard point-to-point encapsulation scheme. In certain embodiments, edge router 130 associates one or more tunnel interfaces 132c with loopback interface 132b (see, e.g., command 236 of FIG. 2).

In the illustrated embodiment of FIG. 1, edge router 130 receives IPv4 packets 122a from host 120a. In some embodiments, edge router 130 identifies the destination address in the header of each IPv4 packet 122a and compares it to a lookup table to determine where to send IPv4 packets 122a. In certain embodiments, the destination address in the header of IPv4 packet 122 is the IPv4 address of host 120b. Edge router 130 may determine from the lookup table that the outbound interface to the next hop is physical interface 132a, which is associated with an IPv6 address. If edge router 130 determines that the outbound interface to the next hop is physical interface 132a, edge router 130 adds an IPv6 header to IPv4 packet 122. For example, edge router 130 may generate encapsulated IPv6 packet 122b by encapsulating its own IPv6 address into the source address field of IPv4 packet 122a and the IPv6 address of border router 140 into the destination address field of IPv4 packet 122a, set the value of the version field to 6, and set the next header field to 4. In certain embodiments, edge router 130 searches the IPv6 routing table based on the destination address field carried in the IPv6 packet header and forwards encapsulated IPv6 packet 122b to border router 140.

In certain embodiments, edge router 130 uses an enhanced IPv6 SLA operation 134 to automatically update the IPv6 address of physical interface 132a. IPv6 SLA operation 134 is traditionally used to measure and provide SLAs, verify service levels, verify outsourced service level agreements, understand network performance, perform network assessments, verify quality of service (QoS), assist administrators with network troubleshooting, and the like. Probes for IPv6 SLA operation 134 may be generated using the software commands (see, e.g., commands 254 through 258 of FIG. 2). IPv6 SLA operation 134 may be include an IP SLA schedule, a start time, a duration, and the like.

In certain embodiments, IPv6 SLA operation 134 is an IPv6 SLA HTTP operation. An IPv6 SLA HTTP operation is traditionally used to monitor the response time between a device and an HTTP server to retrieve a web page. IPv6 SLA operation 134 may be sourced from an IPv6 interface directly. In some embodiments, IPv6 SLA operation 134 probes an external HTTP server (e.g., a Virtual Network Enabler (VNE) server) of border router 140 to build bi-directional IPv4 over IPv6 tunnel 160 with minimal configuration and operational dependency. This enhanced IPv6 SLA operation 134 may provide an advantage to the service provider by allowing the service provider to manage and automate the configuration of IPv4 over IPv6 tunnel 160 without dependency of site addressing. In certain embodiments, IPv4 over IPv6 tunnel 160 is established bi-directionally by border router 140 automatically acquiring the IPv6 address of physical interface 132a. This embodiment simplifies operational overload when scaled up to hundreds or thousands of remote sites.

In certain embodiments, IPv6 SLA operation 134 includes a URL, a name server, and an identification of physical interface 132a of edge router 130. The URL may include the information needed to access the resource from the HTTP server. For example, the URL may be a web address that includes a unique name and a password that can be used by border router 140 to access an IPv6 Domain Name System (DNS) record for physical interface 132a. In certain embodiments, the name server is a server in the DNS that translates the identification of physical interface 132a into its associated IPv6 address. The name server may store and organize DNS records that pair an identification of an interface with one or more IP addresses. The identification of physical interface 132a may include the type of physical interface 132a (e.g., a Gigabit Ethernet interface), an associated slot number, an associated port number, etc. In certain embodiments, IPv6 SLA operation 134 is used to communicate the identification of physical interface 132a to HTTP server of border router 140. Border router 140 may use the username and password in the URL of IPv6 SLA operation 134 to access the IPv6 DNS record for physical interface 132a and resolve its IPv6 address. In the event the IPv6 address changes, IPv6 SLA operation 134 provides border router 140 access to the updated IPv6 address.

Border router 140 is a specialized router that resides at the boundary of IPv6 network 116 and IPv4 network 114. In certain embodiments, border router 140 uses static and/or dynamic routing to send data to and/or receive data from one or more networks 110 of system 100. Border router 140 may include software, one or more hardware devices, one or more servers that include routing software, and the like. Border router 140 includes one or more physical and/or virtual interfaces. IN the illustrated embodiment of FIG. 1, border router 140 is a general IPv6 border router.

In certain embodiments, a VNE server at border router 140 terminates traffic received from edge router 130 via IPv4 over IPv6 tunnel 160. In certain embodiments, upon receiving encapsulated IPv6 packet 122b from edge router 130, border router 140 decapsulates IPv6 packet 122b by removing its IPv6 header based on the version field. Border router 140 may determine that encapsulated IPv6 packet 122b is IPv4 packet 122a based on the next header field. In some embodiments, border router 140 searches the IPv4 routing table based on the destination address field of IPv4 packet 122a and forwards IPv4 packet 122a to host 122b of IPv4 network 114.

SD-WAN controller 150 of system 100 is a controller that oversees the control plane of the SD-WAN fabric. In certain embodiments, SD-WAN controller 150 manages provisioning, maintenance, and/or security for the entire SD-WAN overlay network. In certain embodiments, SD-WAN controller 150 is software that runs on one or more servers. SD-WAN controller 150 is configured to connect to the Internet or other WAN transport network via one or more interfaces. One or more IP addresses (IPv4 and/or IPv6 addresses) may be assigned to one or more interfaces of SD-WAN controller 150.

IPv4 over IPv6 tunnel 160 of system 100 is a link that connects two IPv4 domains (LAN 112 and IPv4 network 114) through IPv6 network 116. In certain embodiments, IPv4 over IPv6 tunnel 160 is a fixed channel that facilitates communication between edge router 130 and border router 140. In certain embodiments, IPv4 over IPv6 tunnel 160 is a point-to-point tunnel.

In certain embodiments, edge router 130 acts as an agent between LAN 112 (a private network) and IPv6 network 116 (a public network). For example, edge router 130 may receive service-side IPv4 packets 122a from host 120 of LAN 112. In certain embodiments, edge router 130 enables NAT44 on loopback interface 132b of IPv4 over IPv6 tunnel 160. Edge router 130 may use NAT44 to translate the service-side source IPv4 address associated with IPv4 packet 122a into a public, globally unique IPv4 address. Edge router 130 may then encapsulate IPv4 packet 122a with the public, globally unique IPv6 address into encapsulated IPv6 packet 122b and communicate encapsulated IPv6 packet 122b to border router 140 via IPv4 over IPv6 tunnel 160. In certain embodiments, edge router 130 applies NAT44 to control traffic prior to communicating control traffic to SD-WAN controller 150. Edge router 130 may apply NAT44 to IPv4 Direct Internet Access (DIA) traffic prior to communicating the IPv4 DIA traffic to border router 140 via IPv4 over IPv6 tunnel 160. Edge router 130 sends site-to-site traffic between LAN 112 and IPv4 network 114 transparently via SD-WAN overlay tunnel 170 without applying NAT.

SD-WAN overlay tunnel 170 of system 100 is an IP Security (IPsec) link between edge router 130 and border router 140. In certain embodiments, SD-WAN overlay tunnel 170 is formed between two TLOCs. Each TLOC defines a specific interface in the SD-WAN overlay network. In certain embodiments, each TLOC is uniquely identified by a 3-tuple of IP address, color, and encapsulation. In some embodiments, the Overlay Management Protocol (OMP) governs the routing within the SD-WAN overlay. For example, the OMP protocol may run over DTLS connections between edge router 130 and SD-WAN controller 150. In certain embodiments, the attributes for each TLOC are exchanged in OMP updates.

In some embodiments, edge router 130 identifies loopback interface 132b as tunnel interface 132c for SD-WAN overlay tunnel 170. Edge router 130 may use loopback interface 132b to communicate with border router 140 since loopback interface 132b stays in the "up" state after being created. In certain embodiments, edge router 130 binds SD-WAN overlay tunnel 170 to IPv4 over IPv6 tunnel (see, e.g., command 330 of FIG. 3).

In operation, edge router 130 of system 100 acquires an IPv6 address for its physical interface (e.g., a Gigabit Ethernet interface). The IPv6 address of physical interface 132a may be acquired dynamically via a DHCP server. Edge router 130 configures IPv4 over IPv6 tunnel 160 between edge router 130 and border router 140 using physical interface 132a. Edge router 130 then acquires an updated IPv6 address for physical interface 132a and uses IPv6 SLA operation 134 to communicate a URL, a name server address, and an identification of physical interface 132a to an HTTP server of border router 140. Border router 140 uses a username and a password provided in the URL to access the IPv6 DNS record and translates the identification of physical interface 132a to the updated IPv6 address. Border router 140 then establishes a bidirectional IPv4 over IPv6 tunnel.

Edge router 130 configures loopback interface 132b and assigns loopback interface 132b an IPv4 address. In certain embodiments, the IPv4 address of loopback interface 132b is provided by a service provider. Edge router 130 uses the IPv4 address of loopback interface 132b to establish SD-WAN overlay tunnel 170 between edge router 130 and border router 140. Edge router 130 binds SD-WAN overlay tunnel 170 to IPv4 over IPv6 tunnel 160. Edge router 130 then communicates with IPv4 SD-WAN controller 150 via bidirectional IPv4 over IPv6 tunnel 160 of an underlay network and establishes a control connection with SD-WAN controller 160. Edge router 130 automatically builds SD-WAN overlay tunnel 170 with bidirectional IPv4 over IPv6 tunnel 160 as a transport.

Edge router 130 enables NAT44 on loopback interface 132b of IPv4 over IPv6 tunnel 160. Edge router 130 receives IPv4 packet 122a from host 120. IPv4 packet 122a includes a service-side source IPv4 address and a destination IPv4 address. Edge router 130 uses IPv4 loopback interface 132b to translate, using NAT44, the service-side source IPv4 address to a public source IPv4 address. Edge router 130 then encapsulates IPv4 packet 122a within IPv6 packet 122b and communicates encapsulated IPv6 packet 122b to border router 140 via IPv4 over IPv6 tunnel 160. Upon receiving encapsulated IPv6 packet 122b, border router 140 decapsulates IPv6 packet 122b and communicates IPv4 packet 122a to host 122b of IPv4 network 114. As such, system 100 provides SD-WAN fabric connectivity over IPv6 transit networks via an automatic IPv4 over IPv6 tunnel.

Although FIG. 1 illustrates a particular number of networks 110, LANs 112, IPv4 networks 114, IPv6 networks 116, hosts 120 (host 120a and host 120b), packets 122 (IPv4 packet 122a and encapsulated IPv6 packet 122b), edge routers 130, interfaces 132 (physical interface 132a, loopback interface 132b, and tunnel interface 132c), IPv6 SLA operations 134, border routers 140, SD-WAN controllers 150, IPv4 over IPv6 tunnels 160, and SD-WAN overlay tunnels 170, this disclosure contemplates any suitable number of networks 110, LANs 112, IPv4 networks 114, IPv6 networks 116, hosts 120, packets 122, edge routers 130, interfaces 132, IPv6 SLA operations 134, border routers 140, SD-WAN controllers 150, IPv4 over IPv6 tunnels 160, and SD-WAN overlay tunnels 170. For example, system 100 may include more than one SD-WAN controller 150.

Although FIG. 1 illustrates a particular arrangement of a network 110, LAN 112, IPv4 network 114, IPv6 network 116, hosts 120 (a host 120a and a host 120b), packets 122 (IPv4 packet 122a and encapsulated IPv6 packet 122b), edge router 130, interfaces 132 (physical interface 132a, loopback interface 132b, tunnel interface 132c), IPv6 SLA operation 134, border router 140, SD-WAN controller 150, IPv4 over IPv6 tunnel 160, and SD-WAN overlay tunnel 170, this disclosure contemplates any suitable arrangement of network 110, LAN 112, IPv4 network 114, IPv6 network 116, hosts 120, packets 122, edge router 130, interfaces 132, IPv6 SLA operation 134, border router 140, SD-WAN controller 150, IPv4 over IPv6 tunnel 160, and SD-WAN overlay tunnel 170.

Furthermore, although FIG. 1 describes and illustrates particular components, devices, or systems carrying out particular actions, this disclosure contemplates any suitable combination of any suitable components, devices, or systems carrying out any suitable actions.

FIG. 2 illustrates a configuration 200 to support the establishment of an IPv4 over IPv6 tunnel, in accordance with certain embodiments. Configuration 200 may be used by system 100 of FIG. 1. For example, configuration 200 may be used by system 100 of FIG. 1 to configure physical interface 132a of edge router 130 to establish IPv4 over IPv6 tunnel 160.

Configuration 200 uses a command-line interface (CLI) 202. CLI 202 may be used for configuring, monitoring, and/or maintaining one or more network components (e.g., edge router 130 and border router 140 of FIG. 1). CLI 202 allows a user to execute Internetwork Operating System (IOS) commands using a router console, a terminal, remote access methods, and the like. CLI 202 uses commands 204 through 262 to configure a Gigabit Ethernet interface (interface GigabitEthernet0/0/1) to establish an IPv4 over IPv6 tunnel.

Command 204 (interface GigabitEthernet0/0/1) is used to enter the configuration mode for the Gigabit Ethernet interface. Command 206 (description NGN IPv6 Transports) is used to create a custom description for the Gigabit Ethernet interface on the device. Command 208 (load-interval 30) instructs the IOS to calculate load statistics over a 30-second time period. Command 210 (negotiation auto) configures the Gigabit Ethernet interface to work in auto-negotiation mode, which may allow a device (e.g., edge router 130 of FIG. 1) to communicate with the device (e.g., border router 140) on the other end of the link to determine the optimal duplex mode and speed for the connection. Command 212 (ipv6 dhcp client pd prefix-from-provider) gives the DHCP client prefix delegation the name prefix-from-provider. Command 214 (ipv6 dhcp client request vendor) enables the Gigabit Ethernet interface to request a vendor-specific option. Command 216 (ipv6 address dhcp) enables the interface to acquire an IPv6 address from the DHCPv6 server. Command 218 (ipv6 address fe80::6a:b99d:100:0 link-local) configures fe80::6a:b99d:100:0 as the link-local address for the interface. Command 220 (ipv6 address autoconfig default-route) configures a default route. Command 222 (ipv6 nd ra suppress all) disables the sending of router advertisement messages on the Gigabit Ethernet interface. Command 224 (ipv6 enable) enables IPv6 processing on the Gigabit Ethernet interface.

Command 226 (interface Loopback 1000) specifies a loopback interface and enters configuration mode for the loopback interface. Command 228 (no shutdown) instructs the loopback interface to remain up (active). Command 230 (ip address 200.61.10.1 255.255.255.0) specifies an IP address (200.61.10.1) for the loopback interface, enables IP processing on the loopback interface, and specifies the subnet (255.255.255.0) for the loopback address. Command 232 (exit) exits the loopback tunnel configuration mode.

Commands 234 through 252 establish the IPv4 over IPv6 tunnel. Command 234 (interface Tunnel 1000) identifies the tunnel interface of the IPv4 over IPv6 tunnel. Command 236 (ip unnumbered Loopback 1000) configures the tunnel interface to borrow the IP address of the loopback interface. Command 236 allows the IP address of the tunnel interface to be shared with the loopback interface. Command 238 (ip mtu 1460) specifies the maximum size (maximum transmission unit (MTU)) of an IP payload (1460 bytes) that is allowed to be transmitted. Command 240 (ip nat outside) translates the source IP address of packets that travel from outside to inside. Command 242 (ip tcp adjust-mss 1420) adjusts the maximum segment size (MSS) value of the TCP synchronize/start (SYN) packets, which may prevent TCP sessions from being dropped. Command 244 (tunnel source GigabitEthernet0/0/1) configures the tunnel source to be the identification of the Gigabit Ethernet interface. Command 246 (tunnel destination 2002:1:1:1::2) configures the destination IP address of the tunnel. Command 248 (tunnel mode ipv6) configures generic packet tunneling over IPv6 encapsulation for the tunnel interface. Command 250 (tunnel path-mtu-discovery) enables path MTU discovery on the tunnel. Command 252 (tunnel route-via GigabitEthernet0/0/1 mandatory) specifies the outgoing interface to be used by the tunnel.

Commands 254 through 258 establish the IP SLA operation. Command 254 (ip sla 10) specifies an identification number (10) for the IP SLA operation. Command 256 (http get http://example.cisco.com/update?user.jpnefitest&pss_=jpnefixtest001 name-server 2001:4860:4860::8888 source-interface GigabitEthernet0/0/1) defines an HTTP operation and enters IP SLA configuration mode. Command 256 (http get http://example.cisco.com/update?user.jpnefitest&pass=jpnefixtest001) formats a GET request based on the specified URL. In certain embodiments, the URL provides a unique username and password that may be used to access an IPv6 DNS record. Command 256 (name-server 2001:4860:4860::8888) provides the IP address of the name server. Command 256 (source-interface GigabitEthernet0/0/1) provides the identification of the source interface (GigabitEthernet0/0/1). Command 258 (ip sla schedule 110 life forever start-time now) configures the scheduling parameters for a single IP SLA operation. Command 258 (ip sla schedule 110) indicates the entry number (110) of the specific IP SLA test. Command 258 (life forever) schedules the duration of the IP SLAs operations to run indefinitely. Command 258 (start-time now) indicates the time (now) at which the group of IP SLAs operations will start collecting information.

Although FIG. 2 illustrates a particular configuration to support the establishment of an IPv4 over IPv6 tunnel, this disclosure contemplates any suitable configuration to support the establishment of an IPv4 over IPv6 tunnel. For example, in lieu of the Gigabit Ethernet interface, configuration 200 may use any other suitable type of physical interface. As another example, in lieu of the DHCP server, configuration 200 may use any type of network server or an IPv6 auto-configuration that automatically provides and assigns IP addresses.

Although this disclosure describes and illustrates particular commands of configuration 200 of FIG. 2 as occurring in a particular order, this disclosure contemplates any suitable commands of configuration 200 of FIG. 2 occurring in any suitable order. Although this disclosure describes and illustrates a particular configuration to support the establishment of an IPv4 over IPv6 tunnel including the particular commands of configuration 200, this disclosure contemplates any suitable configuration to support the establishment of an IPv4 over IPv6 tunnel including any suitable commands, which may include all, some, or none of the commands of configuration 200, where appropriate. Although FIG. 2 describes and illustrates particular components, devices, or systems carrying out particular actions, this disclosure contemplates any suitable combination of any suitable components, devices, or systems carrying out any suitable actions.

FIG. 3 illustrates a configuration 300 to support SD-WAN fabric connectivity via NAT44 for an IPv4 over IPv6 tunnel via a single loopback interface with a public global IP address, in accordance with certain embodiments. Configuration 300 may be used by system 100 of FIG. 1. For example, configuration 300 may be used by system 100 of FIG. 1 to support SD-WAN fabric connectivity via NAT44 for IPv4 over IPv6 tunnel 160 via loopback interface 132b with a public global IP address.

Configuration 300 uses a CLI 302. CLI 302 may be used for configuring, monitoring, and/or maintaining one or more network components (e.g., edge router 130 and border router 140 of FIG. 1). CLI 302 allows a user to execute IOS commands using a router console, a terminal, remote access methods, and the like. CLI 302 of configuration 300 uses commands 304 through 334.

Command 304 (ip route 0.0.0.0.0.0.0.0 Tunnel 1000 200.60.10.2) configures a global default route for the IPv4 over IPv6 tunnel. Command 306 (ip nat inside source list nat-dia-vpn-hop-access-list interface Tunnel 1000 overload) advertises the IPv4 over IPv6 tunnel with a NAT pool and interface overload mode. Command 308 (interface Tunnel 10001) specifies the interface tunnel number for the SD-WAN overlay tunnel and enters the configuration mode for the SD-WAN overlay tunnel. Command 310 (no shutdown) instructs the tunnel interface to remain up (active). Command 312 (ip unnumbered Loopback 1000) configures the tunnel interface to borrow the IP address of the loopback interface. Command 314 (tunnel source Loopback 1000) configures the tunnel source to be the identification of the loopback interface. Command 316 (tunnel mode sdwan) enables the SD-WAN overlay tunneling mode on the SD-WAN overlay tunnel. Command 318 (exit) exits the configuration mode for the interface tunnel.

Command 320 (sdwan) shows the SD-WAN configuration. Command 322 (interface Loopback 1000) identifies the loopback interface and enters the loopback interface configuration mode. Command 324 (tunnel-interface) configures the loopback interface as the tunnel interface. Command 326 (encapsulation ipsec) specifies the encapsulation (IPSec) of the loopback interface. Command 328 (color public-internet) specifies the WAN transport (public-internet) of the loopback interface. Command 330 (bind Tunnel 1000) binds the IPv4 over IPv6 tunnel to the loopback interface. Command 332 (exit) exits the configuration mode for the loopback interface and returns to the global configuration mode. Command 334 (exit) exits the global configuration mode. As such, configuration 300 properly establishes the SD-WAN fabric with transit over IPv6 networks.

Although FIG. 3 illustrates a particular configuration to support SD-WAN fabric connectivity via NAT44 for an IPv4 over IPv6 tunnel via a single loopback interface with a public global IP address, this disclosure contemplates any suitable configuration to support SD-WAN fabric connectivity. Although this disclosure describes and illustrates particular commands of configuration 300 of FIG. 3 as occurring in a particular order, this disclosure contemplates any suitable commands of configuration 300 of FIG. 3 occurring in any suitable order. Although this disclosure describes and illustrates a particular configuration to support SD-WAN fabric connectivity via NAT44 for an IPv4 over IPv6 tunnel via a single loopback interface with a public global IP address including the particular commands of configuration 300, this disclosure contemplates any suitable configuration to SD-WAN fabric connectivity including any suitable commands, which may include all, some, or none of the commands of configuration 300, where appropriate. Although FIG. 3 describes and illustrates particular components, devices, or systems carrying out particular actions, this disclosure contemplates any suitable combination of any suitable components, devices, or systems carrying out any suitable actions.

FIG. 4 illustrates SD-WAN control connections 400, in accordance with certain embodiments. SD-WAN control connections 400 may be used by system 100 of FIG. 1. For example, SD-WAN control connections 400 may be established between edge router 130 and SD-WAN controller 150 of system 100. SD-WAN control connections 400 illustrated in FIG. 4 are established between an edge router and IPv4 controllers (two smart controllers and a centralized network management system). In certain embodiments, SD-WAN control connections 400 are established based on configuration 200 of FIG. 2 and/or configuration 300 of FIG. 3.

SD-WAN control connections 400 are displayed using a CLI 402. CLI 402 may be used for configuring, monitoring, and/or maintaining one or more network components (e.g., edge router 130 and border router 140 of FIG. 1). CLI 402 allows a user (e.g., an administrator) to view SD-WAN control connections 400 using a router console, a terminal, remote access methods, and the like. Command 404 (Br4-cEdge1#show sdwan control connections) displays the active SD-WAN control connections 400 (400a through 400c) for an edge router (cEdge1). The output fields for SD-WAN control connections 400 include a peer type 410, a peer protocol 412, a peer system IP 414, a site ID 416, a domain ID 418, a peer private IP 420, a peer private port 422, a peer public ID 424, a peer public port 426, a group organization 428, a local color 430, a proxy 432, a state 434, and an uptime ID 436.

Peer type 410 indicates the type of SD-WAN device (e.g., a smart controller, a management configuration system, an orchestrator, etc.). Peer protocol 412 indicates the type of protocol (e.g., Datagram Transport Layer Security (DTLS)) used to establish the connection to the SD-WAN device. Peer system IP 414 is a persistent, system-level IPv4 address that uniquely identifies the SD-WAN device independently of any interface addresses. Site ID 416 is a unique identifier of a site in the SD-WAN overlay network with a numeric value 1 through 4294967295 (2^32-1). Site ID 416 identifies the source location of an advertised prefix.

Domain ID 418 identifies the domain that the SD-WAN device is a member of. Peer private IP 420 indicates the private IP address (the pre-NAT IP address assigned to the interface of the SD-WAN device). Peer private port 422 indicates the private port number of the SD-WAN device. Peer public IP 424 indicates the public IP address (the post-NAT IP address assigned to the interface of the SD-WAN device). In the absence of NAT, peer private IP 420 and peer public IP 424 are the same. Peer public port 426 indicates the public port number of the SD-WAN device.

Group organization 428 (e.g., Cisco SD-WAN) indicates the name of the organization specified in the SD-WAN device certificates. Local color 430 (e.g., 3 g, biz-internet, blue, bronze, custom1, custom2, custom3, default, gold, green, lte, public-internet, red, and silver, etc.) identifies an individual TLOC used for the connection. Proxy 432 indicates whether the connection is a proxy connection. State 434 indicates the state of the particular session (e.g., down, initiated, invalid, up, etc.). Uptime ID 436 indicates the time that the connection came up. SD-WAN control connections 400 of FIG. 4 include SD-WAN control connection 400a, SD-WAN control connection 400b, and SD-WAN control connection 400c.

SD-WAN control connection 400a is a DTLS control connection established between the customer edge router and a vSmart controller. As indicated in FIG. 4, peer type 410 is an SD-WAN controller (vsmart), peer protocol 412 is DTLS (dtls), peer system IP 414 is IPv4 address 10.8.3.3, site ID 416 is 10, domain ID 418 is 1, peer private IP 420 is 172.16.3.2, peer private port 422 is 12446, peer public ID 424 is 172.16.3.2, peer public port 426 is 12446, group organization 428 is Cisco Sy1-19968, local color 430 is public-internet, proxy 432 is No, state 434 is up, and uptime ID 436 is 2:19:09:15.

SD-WAN control connection 400b is another DTLS control connection established between the customer edge router and a vSmart controller. As indicated in FIG. 4, peer type 410 is an SD-WAN controller (vsmart), peer protocol 412 is DTLS (dtls), peer system IP 414 is 10.8.4.4, site ID 416 is 10, domain ID 418 is 1, peer private IP 420 is 172.16.4.2, peer private port 422 is 12446, peer public ID 424 is 172.16.4.2, peer public port 426 is 12446, group organization 428 is Cisco Sy1-19968, local color 430 is public-internet, proxy 432 is No, state 434 is up, and uptime ID 436 is 2:19:09:15.

SD-WAN control connection 400c is a DTLS control connection established between the customer edge router and vManage (a network management system). As indicated in FIG. 4, peer type 410 is a network management system (vmanage), peer protocol 412 is DTLS (dtls), peer system IP 414 is 10.8.1.1, site ID 416 is 10, domain ID 418 is 1, peer private IP 420 is 172.16.1.2, peer private port 422 is 13046, peer public ID 424 is 172.16.1.2, peer public port 426 is 13046, group organization 428 is Cisco Sy1-19968, local color 430 is public-internet, proxy 432 is No, state 434 is up, and uptime ID 436 is 2:19:09:15. As illustrated by active SD-WAN control connections 400, configuration 300 of FIG. 3 properly establishes the SD-WAN fabric with transit over IPv6 networks.

Although FIG. 4 illustrates particular SD-WAN control connections 400, this disclosure contemplates any suitable SD-WAN control connections 400 which may include all, some, or none of SD-WAN control connections 400, where appropriate. Although this disclosure describes and illustrates particular SD-WAN control connections 400 as occurring in a particular order, this disclosure contemplates any suitable SD-WAN control connections 400 occurring in any suitable order. Although FIG. 4 describes and illustrates particular components, devices, or systems carrying out particular actions, this disclosure contemplates any suitable combination of any suitable components, devices, or systems carrying out any suitable actions.

FIG. 5 illustrates SD-WAN BFD sessions 500, in accordance with certain embodiments. SD-WAN BFD sessions 500 may be used by system 100 of FIG. 1. For example, SD-WAN BFD sessions 500 may be established between edge router 130 and border router 140 of system 100 of FIG. 1 to detect failures in SD-WAN overlay tunnel 170. In certain embodiments, SD-WAN BFD sessions 500 are established based on configuration 200 of FIG. 2 and/or configuration 300 of FIG. 3.

SD-WAN BFD sessions 500 are displayed using a CLI 502. CLI 502 may be used for configuring, monitoring, and/or maintaining one or more network components (e.g., edge router 130 and border router 140 of FIG. 1). CLI 502 allows a user (e.g., an administrator) to view SD-WAN BFD sessions 500 using a router console, a terminal, remote access methods, and the like. Command 504 (Br4-cEdge1#show sdwan sessions) displays the active SD-WAN BFD sessions 500 between edge router (cEdge1) and border router (Br4). The output fields for SD-WAN BFD sessions 500 include a system IP 510, a site ID 512, a state 514, a source TLOC color 516, a remote TLOC color 518, a source IP 520, a destination public IP 522, a destination public port 524, an encapsulation 526, a detect multiplier 528, a TX interval 530, an uptime 532, and transitions 534.

System IP 510 indicates the system IP for the peers (e.g., SD-WAN controllers). Site ID 512 identifies the SD-WAN network site. State 514 indicates the state of the particular session (e.g., down, initiated, invalid, up, etc.). Source TLOC color 516 (e.g., public-internet, MPLS, LTE, etc.) identifies the specific TLOC on the source (customer edge) device. Remote TLOC color 518 (e.g., public-internet, MPLS, LTE, etc.) identifies the specific TLOC on the remote (border router) device. Source IP 520 indicates the private source IP address of the tunnel. Destination public IP 522 indicates the destination IP address that is used to form the tunnel. Destination public port 524 indicates the public destination port number that is used to form the tunnel. Encapsulation 526 indicates the encapsulation (e.g., IPsec, Generic Routing Encapsulation (GRE), IPsec-Internet Key Exchange (IKE), etc.) configured on the interface of the edge device. Detect multiplier 528 indicates the local detection multiplier of the BFD session. TX interval 530 indicates the interval for sending BFD packets. Uptime 532 indicates the last time that the BFD session came up. Transitions 534 indicates the number times the BFD sessions has changed its status. SD-WAN BFD sessions 500 include SD-WAN BFD sessions 500a through 500j. For each SD-WAN BFD session 500a through 500j, source IP 520 is the source IP address (200.61.10.1) of the loopback interface. As illustrated by active SD-WAN BFD sessions 500, configuration 300 of FIG. 3 properly establishes the SD-WAN fabric with transit over IPv6 networks.

Although FIG. 5 illustrates particular SD-WAN BFD sessions 500, this disclosure contemplates any suitable SD-WAN BFD sessions 500 which may include all, some, or none of SD-WAN BFD sessions 500, where appropriate. Although this disclosure describes and illustrates particular SD-WAN BFD sessions 500 as occurring in a particular order, this disclosure contemplates any suitable SD-WAN BFD sessions 500 occurring in any suitable order. Although FIG. 5 describes and illustrates particular components, devices, or systems carrying out particular actions, this disclosure contemplates any suitable combination of any suitable components, devices, or systems carrying out any suitable actions.

Figure 6:
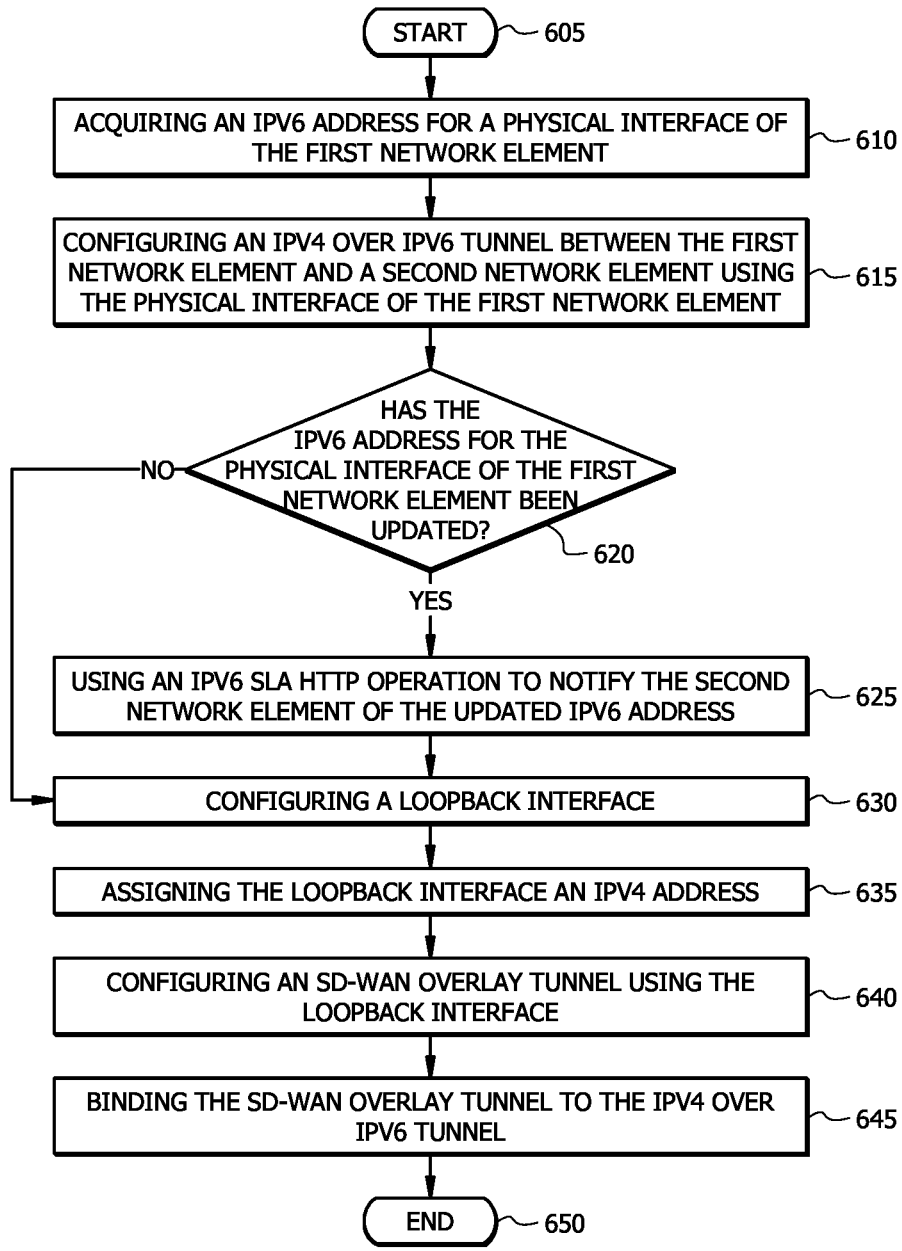
FIG. 6 illustrates a method for providing SD-WAN fabric connectivity over an IPv6 transit network via an automatic IPv4 over IPv6 tunnel, in accordance with certain embodiments.

FIG. 6 illustrates a method 600 for providing SD-WAN fabric connectivity over an IPv6 transit network via an automatic IPv4 over IPv6 tunnel, in accordance with certain embodiments. Method 600 starts at step 605. At step 610 of method 600, a first network element acquires an IPv6 address for a physical interface of the first network element. For example, referring to system 100 of FIG. 1, edge router 130 of network 110 may acquire an IPv6 address for physical interface 132a from a DHCP server. In certain embodiments, configuration 200 (commands 212 through 216) of FIG. 2 may be used to acquire the IPv6 address from the DHCP server. Method 600 then moves from step 610 to step 615.

At step 615 of method 600, the edge router configures an IPv4 over IPv6 tunnel between the first network element and the second network element using the physical interface of the first network element. For example, referring to system 100 of FIG. 1, edge router 130 of network 110 may configure IPv4 over IPv6 tunnel 160 between edge router 130 and the border router 140 using physical interface 132a of edge router 130. In certain embodiments, configuration 200 (commands 234 through 252) of FIG. 2 may be used to configure the IPv4 over IPv6 tunnel. Method 600 then moves from step 615 to step 620.

At step 620 of method 600, the edge router determines whether the IPv6 address for the physical interface of the first network element has been updated. For example, referring to system 100 of FIG. 1, edge router 130 of network 110 may receive an updated IPv6 address for physical interface 132a from the DHCP server. If the edge router determines that the IPv6 address for the physical interface of the first network element has been updated, method 600 moves from step 620 to step 625, where the edge router uses an IPv6 SLA HTTP operation to notify the second network element of the updated IPv6 address to establish a bidirectional IPv4 over IPv6 tunnel. For example, referring to system 100 of FIG. 1, edge router 130 of network 110 may receive an updated IPv6 address for physical interface 132a of edge router 130. Edge router 130 may use IPv6 SLA operation 134 to notify border router 140 of the updated IPv6 address. In certain embodiments, configuration 200 (commands 254 through 258) of FIG. 2 may be used to perform the IPv6 SLA HTTP operation. Method 600 then moves from step 625 to step 630. If, at step 620 of method 600, the edge router determines that the IPv6 address for the physical interface of the first network element has not been updated, method 600 advances from step 620 to step 630.

At step 630 of method 600, the edge router configures a loopback interface. For example, referring to system 100 of FIG. 1, edge router 130 of network 110 may configure loopback interface 132b. Method 600 then moves from step 630 to step 635, where the edge router assigns an IPv4 address to the loopback interface. In certain embodiments, configuration 200 (commands 226 through 232) of FIG. 2 may be used to configure the loopback interface. Method 600 then moves from step 635 to step 640, where the edge router configures an SD-WAN overlay tunnel using the loopback interface. For example, referring to system 100 of FIG. 1, edge router 130 of network 110 may configure SD-WAN overlay tunnel 170 using loopback interface 132*b*. Method 600 then moves from step 640 to step 645.

At step 645 of method 600, the edge router binds the SD-WAN overlay tunnel to the IPv4 over IPv6 tunnel. For example, referring to system 100 of FIG. 1, edge router 130 of network 110 may bind SD-WAN overlay tunnel 170 to IPv4 over IPv6 tunnel 160. In certain embodiments, configuration 300 of FIG. 3 may be used to configure the SD-WAN overlay tunnel and bind the SD-WAN overlay tunnel to the IPv4 over IPv6 tunnel. Method 600 then moves from step 645 to step 650, where method 600 ends. As such, method 600 may be used to provide SD-WAN fabric connectivity over an IPv6 transit network via an automatic IPv4 over IPv6 tunnel.

Although this disclosure describes and illustrates particular steps of method 600 of FIG. 6 as occurring in a particular order, this disclosure contemplates any suitable steps of method 600 of FIG. 6 occurring in any suitable order. Although this disclosure describes and illustrates an example method for providing SD-WAN fabric connectivity over an IPv6 transit network including the particular steps of method 600 of FIG. 6, this disclosure contemplates any suitable method for providing SD-WAN fabric connectivity over an IPv6 transit network including any suitable steps, which may include all, some, or none of the steps of method 600 of FIG. 6, where appropriate. Although FIG. 6 describes and illustrates particular components, devices, or systems carrying out particular actions, this disclosure contemplates any suitable combination of any suitable components, devices, or systems carrying out any suitable actions.

Figure 7:
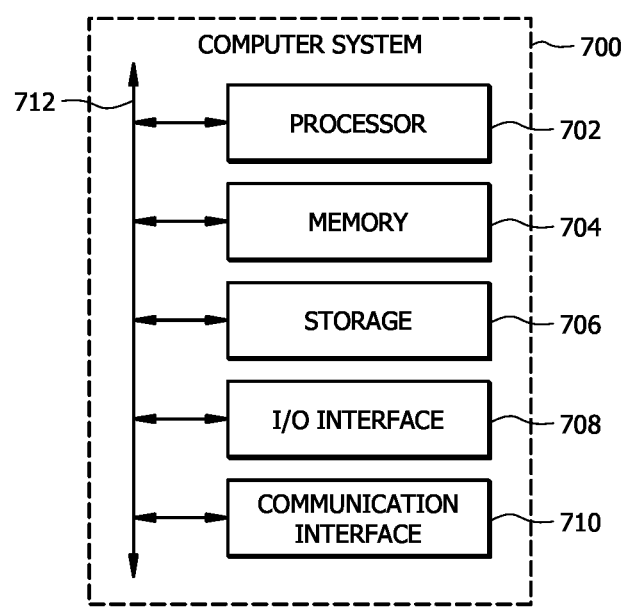
FIG. 7 illustrates a computer system that may be used by the systems and methods described herein, in accordance with certain embodiments.

FIG. 7 illustrates an example computer system 700. In particular embodiments, one or more computer system 700 perform one or more steps of one or more methods described or illustrated herein. In particular embodiments, one or more computer system 700 provide functionality described or illustrated herein. In particular embodiments, software running on one or more computer system 700 performs one or more steps of one or more methods described or illustrated herein or provides functionality described or illustrated herein. Particular embodiments include one or more portions of one or more computer system 700. Herein, reference to a computer system may encompass a computing device, and vice versa, where appropriate. Moreover, reference to a computer system may encompass one or more computer systems, where appropriate.

This disclosure contemplates any suitable number of computer system 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer system 700; be unitary or distributed; span multiple locations; span multiple machines; span multiple data centers; or reside in a cloud, which may include one or more cloud components in one or more networks. Where appropriate, one or more computer system 700 may perform without substantial spatial or temporal limitation one or more steps of one or more methods described or illustrated herein. As an example, and not by way of limitation, one or more computer system 700 may perform in real time or in batch mode one or more steps of one or more methods described or illustrated herein. One or more computer system 700 may perform at different times or at different locations one or more steps of one or more methods described or illustrated herein, where appropriate.

In particular embodiments, computer system 700 includes a processor 702, a memory 704, a storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer system 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a LAN, a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments disclosed herein include a method, an apparatus, a storage medium, a system and a computer program product, wherein any feature mentioned in one category, e.g., a method, can be applied in another category, e.g., a system, as well.

What is claimed is:

1. A first network element comprising one or more processors and one or more computer-readable non-transitory storage media coupled to the one or more processors and including instructions that, when executed by the one or more processors, cause the first network element to perform operations comprising:
   acquiring an Internet Protocol version 6 (IPv6) address for a physical interface of the first network element;
   configuring an Internet Protocol version 4 (IPv4) over IPv6 tunnel between the first network element and a second network element using the physical interface of the first network element;
   acquiring an updated IPv6 address for the physical interface of the first network element;
   using an IPv6 Service Level Agreement (SLA) Hypertext Transfer Protocol (HTTP) operation to notify the second network element of the updated IPv6 address to establish a bidirectional IPv4 over IPv6 tunnel;
   configuring a loopback interface;
   assigning the loopback interface an IPv4 address;
   configuring an overlay tunnel using the loopback interface, wherein the overlay tunnel is a software-defined wide area network(SD-WAN) overlay tunnel; and
   binding the SD-WAN overlay tunnel to the IPv4 over IPv6 tunnel.

2. The first network element of claim 1, the operations further comprising:
   communicating with an IPv4 SD-WAN controller via the bidirectional IPv4 over IPv6 tunnel of an underlay network;
   establishing a control connection with the IPv4 SD-WAN controller; and
   automatically building the SD-WAN overlay tunnel with the bidirectional IPv4 over IPv6 tunnel as a transport.

3. The first network element of claim 2, the operations further comprising:
   configuring network address translation (NAT) on the loopback interface of the IPv4 over IPv6 tunnel;
   receiving an IPv4 packet from a host, wherein:
      the IPv4 packet comprises a service-side source IPv4 address and a destination IPv4 address; and
      the destination IPv4 address is associated with a remote SD-WAN site;
   translating, using NAT, the service-side source IPv4 address to a public IPv4 address;
   encapsulating the IPv4 packet within an IPv6 packet; and
   communicating, via the bidirectional IPv4 over IPv6 tunnel, the IPv4 packet to the second network element.

4. The first network element of claim 1, wherein the IPv6 SLA HTTP operation comprises:
   a Uniform Resource Locator (URL);
   an IPv6 address of a name server; and
   an identification of the physical interface as a source interface for the IPv6 SLA HTTP operation.

5. The first network element of claim 1, the operations further comprising establishing a Datagram Transport Layer Security (DTLS) control connection with one or more controllers.

6. The first network element of claim 2, wherein:
   the IPv6 address of the physical interface is automatically assigned by a Dynamic Host Configuration Protocol version 6 (DHCPv6) server or by an IPv6 auto-configuration; and
   the IPv4 address of the loopback interface is provided by a service provider.

7. The first network element of claim 1, wherein: the first network element is an SD-WAN edge router; and the second network element is a general IPv6 border router.

8. A method, comprising:
   acquiring an Internet Protocol version 6 (IPv6) address for a physical interface of a first network element;
   configuring an Internet Protocol version 4 (IPv4) over IPv6 tunnel between the first network element and a second network element using the physical interface of the first network element;
   acquiring an updated IPv6 address for the physical interface of the first network element;
   using an IPv6 Service Level Agreement (SLA) Hypertext Transfer Protocol (HTTP) operation to notify the second network element of the updated IPv6 address to establish a bidirectional IPv4 over IPv6 tunnel;
   configuring a loopback interface;
   assigning the loopback interface an IPv4 address;
   configuring an overlay tunnel using the loopback interface, wherein the overlay tunnel is a software-defined wide area network(SD-WAN) overlay tunnel; and
   binding the SD-WAN overlay tunnel to the IPv4 over IPv6 tunnel.

9. The method of claim 8, further comprising:
   communicating with an IPv4 SD-WAN controller via the bidirectional IPv4 over IPv6 tunnel of an underlay network;
   establishing a control connection with the IPv4 SD-WAN controller; and
   automatically building the SD-WAN overlay tunnel with the bidirectional IPv4 over IPv6 tunnel as a transport.

10. The method of claim 9, further comprising:
    configuring network address translation (NAT) on the loopback interface of the IPv4 over IPv6 tunnel;
    receiving an IPv4 packet from a host, wherein:
       the IPv4 packet comprises a service-side source IPv4 address and a destination IPv4 address; and the destination IPv4 address is associated with a remote SD-WAN site;

translating, using NAT, the service-side source IPv4 address to a public IPv4 address;

encapsulating the IPv4 packet within an IPv6 packet; and communicating, via the bidirectional IPv4 over IPv6 tunnel, the IPv4 packet to the second network element.

11. The method of claim 8, wherein the IPv6 SLA HTTP operation comprises:

a Uniform Resource Locator (URL);

an IP address of a name server; and an identification of the physical interface as a source interface for the IPv6 SLA HTTP operation.

12. The method of claim 8, further comprising establishing a Datagram Transport Layer Security (DTLS) control connection with one or more controllers.

13. The method of claim 9, wherein:

the IPv6 address of the physical interface is automatically assigned by a Dynamic Host Configuration Protocol version 6 (DHCPv6) server or by an IPv6 auto-configuration; and the IPv4 address of the loopback interface is provided by a service provider.

14. The method of claim 8, wherein: the first network element is an SD-WAN edge router; and the second network element is a general IPv6 border router.

15. One or more computer-readable non-transitory storage media embodying instructions that, when executed by a processor, cause the processor to perform operations comprising:

acquiring an Internet Protocol version 6 (IPv6) address for a physical interface of a first network element;

configuring an Internet Protocol version 4 (IPv4) over IPv6 tunnel between the first network element and a second network element using the physical interface of the first network element;

acquiring an updated IPv6 address for the physical interface of the first network element;

using an IPv6 Service Level Agreement (SLA) Hypertext Transfer Protocol (HTTP) operation to notify the second network element of the updated IPv6 address to establish a bidirectional IPv4 over IPv6 tunnel;

configuring a loopback interface;

assigning the loopback interface an IPv4 address;

configuring an overlay tunnel using the loopback interface, wherein the overlay tunnel is a software-defined wide area network(SD-WAN) overlay tunnel; and binding the SD-WAN overlay tunnel to the IPv4 over IPv6 tunnel.

16. The one or more computer-readable non-transitory storage media 15, the operations further comprising:

communicating with an IPv4 SD-WAN controller via the bidirectional IPv4 over IPv6 tunnel of an underlay network;

establishing a control connection with the IPv4 SD-WAN controller; and automatically building the SD-WAN overlay tunnel with the bidirectional IPv4 over IPv6 tunnel as a transport.

17. The one or more computer-readable non-transitory storage media of claim 16, the operations further comprising:

configuring network address translation (NAT) on the loopback interface of the IPv4 over IPv6 tunnel;

receiving an IPv4 packet from a host, wherein:

the IPv4 packet comprises a service-side source IPv4 address and a destination IPv4 address; and the destination IPv4 address is associated with a remote SD-WAN site;

translating, using NAT, the service-side source IPv4 address to a public IPv4 address;

encapsulating the IPv4 packet within an IPv6 packet; and communicating, via the bidirectional IPv4 over IPv6 tunnel, the IPv4 packet to the second network element.

18. The one or more computer-readable non-transitory storage media of claim 15, wherein the IPv6 SLA HTTP operation comprises:

a Uniform Resource Locator (URL);

an IP address of a name server; and an identification of the physical interface as a source interface for the IPv6 SLA HTTP operation.

19. The one or more computer-readable non-transitory storage media of claim 15, the operations further comprising establishing a Datagram Transport Layer Security (DTLS) control connection with one or more controllers.

20. The one or more computer-readable non-transitory storage media of claim 16, wherein:

the IPv6 address of the physical interface is automatically assigned by a Dynamic Host Configuration Protocol version 6 (DHCPv6) server or by an IPv6 auto-configuration; and the IPv4 address of the loopback interface is provided by a service provider.

\* \* \* \* \*